May 29, 1951     J. O. P. HUGHES     2,554,739
FLEXIBLE DRIVE
Filed Nov. 8, 1949
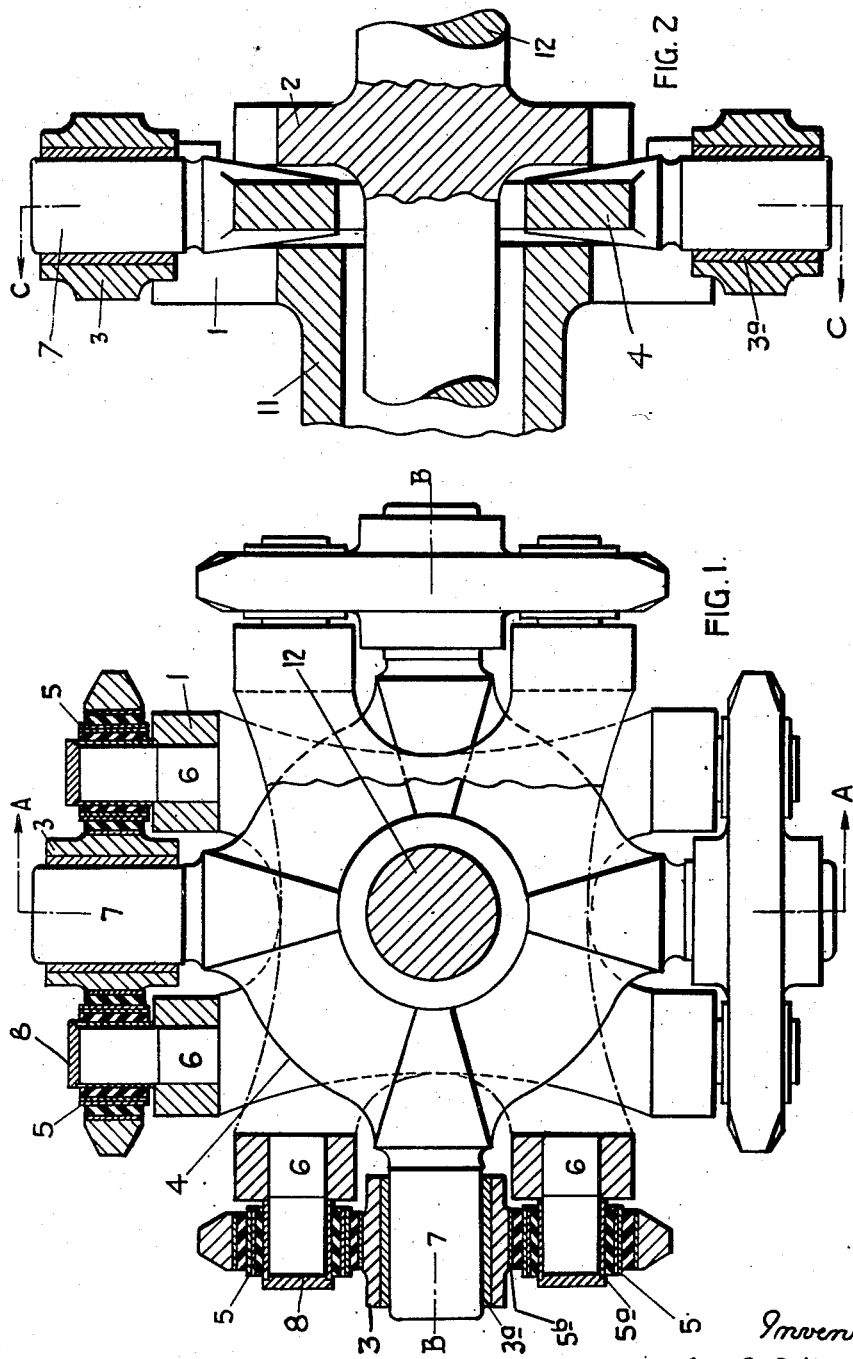
Inventor:
John O. P. Hughes
By Babcock & Babcock
Attorneys

UNITED STATES PATENT OFFICE 2,554,739

FLEXIBLE DRIVE

John Oliver Philip Hughes, Rugby, England, assignor to The English Electric Company Limited, London, England, a British company Application November 8, 1949, Serial No. 126,170
In Great Britain November 15, 1948

4 Claims. (Cl. 64—17)

The invention relates to flexible drives for transmitting torque from a driving member to a coaxial driven member, such as used between the prime mover or gear box fixed to the body of a locomotive or of any other rail or road vehicle and a driven axle thereof.

It is an object of the invention to provide a drive of the kind referred to which is capable of transmitting torque from the driving member to the driven member while allowing a translational relative movement perpendicular to the axis of rotation and also a slight tilting movement such as caused by uneven rise or fall of the wheels on both sides of the axle of a vehicle relative to its body.

It is a further object of the invention to provide a drive of the kind referred to which moreover allows a limited degree of torsional flexibility.

Other objects of the invention will appear later from the description of an embodiment thereof.

According to a main feature of the invention a gimbal member is slidably guided with respect to two pairs of links, the members of each pair lying diametrically opposite one another, and the two pairs being arranged angularly offset with respect to each other, one pair of these links being supported by metal bonded rubber cushions on the ends of a double arm of the driving member, and the other pair of these links being supported by metal bonded cushions on the ends of a double arm of the driven member, whereby any translational movement of the driven member with respect to the driving member perpendicular to the axis of rotation is taken up by the sliding of the gimbal member with respect to either the one or the other pair of links or both simultaneously, according to the angular position of said links with respect to the direction of the said movement.

The metal bonded rubber cushions fixed to the links allow a predetermined amount of rotational movement to occur between the driving member and the gimbal member and between the gimbal member and the driven member, owing to the radial deflection of the rubber in said cushions under the influence of the torque transmitted by the coupling, thereby providing resiliency for torsional shocks between the driven and driving member.

In order that the invention may be better understood and readily carried into effect, an embodiment thereof will now be described by way of example with reference to the accompanying drawings of which:

Fig. 1 is a cross section along the line C—C of Fig. 2, and

Fig. 2 is a longitudinal section along the line A—A of Fig. 1.

The driving member 11 (gear shaft) carries a double arm 1, and the coaxial driven member 12 (locomotive axle) carries a double arm 2 arranged at right angles to the double arm 1. At both ends of each of these arms 1, 2 there are arranged two studs 6 parallel to the diameter of symmetry of the respective arm, all studs 6 lying substantially in the same rotational plane.

A gimbal member consists of a ring 4 embracing the driven member 12 with ample clearance and having four radial pins 7 arranged on two perpendicular diameters and lying substantially in the same rotational plane as the studs 6 of the double arms 1, 2.

Four links 3 are slidably arranged with their central bushes 3a on the said four pins 7 of the gimbal ring, each link having two metal bonded rubber bushes 5 arranged on both sides of the central bush 3a and parallel thereto. The outer sleeves 5b of the rubber bushes 5 are fixed in the links 3 while their inner sleeves 5a are retained by means of end plates 8 and of screws (not shown) on the studs 6 of the double arms 1 and 2, respectively. Dual concentrical rubber bushes 5 may be used for a purpose to be explained later.

The operation of the flexible drive is as follows:—

The gear shaft 11 is rotating about a centre fixed relatively to the locomotive frame while the locomotive axle 12 is free to rise and fall relatively to said frame in one plane only, being restrained by the usual axle box guides (not shown). If this plane is that of the section line AA in Fig. 1 then any bounce of the axle arm 2 carries the gimbal member 4 with it relatively to the gear arm 1, by sliding the pins 7 through the bushes 3a of links 3. Assuming now the locomotive axle 12 to be rotated through 90° and the axle still bouncing in the plane of the section line AA then the gimbal member 4 no longer moves in relation to the gear arm 1: sliding takes place between the gimbal member 4 and the pins 7 of the axle arm 2 only. It is clear that, for any intermediate angular position, bounce of the axle 12 is met by the gimbal member 4 sliding both in the gear arm 1 and the axle arm 2. Angular misalignment causes turning of the gimbal member 4 about the axis AA or BB of Fig. 1, or both AA and BB simultaneously, in the manner of a universal joint. Angularity and bounce of the locomotive axle 12 can occur simultaneously.

All the torque transmitted by the drive passes through the rubber bushes 5, four bushes transmitting the torque from the gear arm 2 to the gimbal member 4 and four from the gimbal member 4 to the axle arm 1. Torsional flexibility is secured by the compressibility of the rubber bushes 5 which may be increased by using concentrical dual rubber bushes as shown.

The flexible drive according to the invention may be used in conjunction with the asymmetrical gear drive according to my co-pending application Serial No. 54,463 and is then accessibly placed outside the gear box so that full advantage can be taken of the fact that all the elements subject to wear or ageing, such as rubber bushes 5 and sleeves 3a, can be removed in a radial direction.

Any small lateral movement of the axle 12 with respect to the gear shaft 11 is allowed for by sliding the final straight tooth gear of the gear drive across its pinion, this movement being cushioned by all the rubber bushes 5.

I wish it to be understood that I do not limit myself to the exact construction and dimensions described and shown, since obvious modifications will offer themselves to those skilled in the art.

What I claim as my invention and desire to secure by Letters Patent is:

1. A flexible drive for transmitting torque from a driving member to a substantially coaxial driven member comprising: a double driving arm attached to the driving member, a double driven arm attached to the driven member, and arranged for being angularly offset with respect to said double driving arm, a gimbal member, two pairs of radial guide pins, the guide pins of each pair being arranged diametrically opposite one another on the said gimbal member and the said two pairs being angularly offset with respect to one another, four links each slidably arranged with respect to one of the said radial guide pins, pins arranged on the ends of said driven and driving arms parallel to the said pins of the gimbal member, respectively, and metal bonded rubber cushions arranged for resiliently connecting each of the said links with said pins on an end of one of the said double arms.

2. A flexible drive for transmitting torque from a driving member to a substantially coaxial driven member comprising: a double driving arm attached to the driving member, a double driven arm attached to the driven member and arranged for being angularly offset with respect to the said driving arm, a gimbal member, two pairs of radial pins arranged on the said gimbal member, the pins of each pair being in alignment with one another and the said two pairs being angularly offset with respect to one another, four links each arranged slidably and pivotally on one of the said radial pins, pairs of pins arranged on the ends of the said driven and driving arms parallel to the said pins of the gimbal member, respectively, and metal bonded rubber cushions arranged for resiliently connecting each of the said links with the said pins on an end of one of the said double arms.

3. A flexible drive for transmitting torque from a driving member to a substantially coaxial driven member comprising: a double driving arm attached to the driving member, a double driven arm attached to the driven member and angularly offset with respect to said driving arm, a pair of parallel studs extending symmetrically outward from each end of both said double arms and lying all substantially in the same plane of rotation, a gimbal member, two pairs of radial pins arranged on said gimbal member for lying symmetrically between the parallel studs of the said driving and driven arm respectively, four links, each arranged slidably and pivotally on one of the said radial pins, and four pairs of metal bonded rubber cushions, each pair being arranged on one of the said links for resiliently connecting the same with one of the said pairs of studs.

4. A flexible drive for transmitting torque from a driving member to a substantially coaxial driven member comprising: a double driving arm attached to the driving member, a double driven arm attached to the driven member and arranged for being angularly offset with respect to said double driving arm, a gimbal member, two pairs of radial guide members, the guide members of each pair being arranged diametrically opposite one another and the said two pairs being angularly offset with respect to one another, four links, each slidably arranged with respect to one of the said radial guide members, and dual concentrical metal bonded rubber bushes arranged on each of the said links with their axes parallel to the said radial guide members, respectively, for resiliently connecting each of the said links with an end of one of the said double arms.

JOHN OLIVER PHILIP HUGHES.

REFERENCES CITED

The following references are of record in the file of this patent:

UNITED STATES PATENTS

| Number | Name | Date |
|---|---|---|
| 999,971 | Treat | Aug. 8, 1911 |
| 2,336,579 | Venditty et al. | Dec. 14, 1943 |